United States Patent
Shamaie

(10) Patent No.: US 9,626,042 B2
(45) Date of Patent: Apr. 18, 2017

(54) VISION-BASED INTERACTIVE PROJECTION SYSTEM

(71) Applicant: QUALCOMM Incorporated, San Diego, CA (US)

(72) Inventor: Atid Shamaie, Ottawa (CA)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 14/686,630

(22) Filed: Apr. 14, 2015

(65) Prior Publication Data

US 2015/0220213 A1    Aug. 6, 2015

Related U.S. Application Data

(63) Continuation of application No. 13/645,390, filed on Oct. 4, 2012, now Pat. No. 9,030,445.

(Continued)

(51) Int. Cl.
*G06F 3/042* (2006.01)
*G03B 21/14* (2006.01)
(Continued)

(52) U.S. Cl.
CPC ............ *G06F 3/0425* (2013.01); *G03B 17/54* (2013.01); *G03B 21/14* (2013.01); *G06K 9/00375* (2013.01); *G06F 2203/04101* (2013.01)

(58) Field of Classification Search
CPC ......... G06F 3/0425; G06F 2203/04101; G03B 17/54; G03B 21/14; G06K 9/00375; H04N 5/7491
See application file for complete search history.

(56) References Cited

U.S. PATENT DOCUMENTS 6,624,833 B1   9/2003   Kumar et al.
7,058,204 B2   6/2006   Hildreth et al.
(Continued)

FOREIGN PATENT DOCUMENTS

CN       1918532 A      2/2007
JP    2006244446 A      9/2006
(Continued)

OTHER PUBLICATIONS

Bhushansharma B., "Holographic laser equipped Light Touch project images as interactive touchscreesns", Gizmowatch, Jan. 6, 2010, retrieved from http://www.prodisplay.com/front-projection-touch-screens.html on Oct. 3, 2012, 3 pages.
(Continued)

*Primary Examiner* — Liliana Cerullo
(74) *Attorney, Agent, or Firm* — Kilpatrick Townsend & Stockton LLP

(57) ABSTRACT

Techniques are provided to improve interaction between a user and a projection system. In some embodiments, an image of a user in front of a display screen is captured. An inference can then be made as to whether a user is touching a display screen based on an analysis of shadows and/or variation of brightness (i.e., intensities) across pixels in the image. For example, it may be inferred that the object is: (1) approaching the screen when a region surrounding a top of the object is characterized by a relatively small brightness variation; (2) hovering near the screen when the brightness variation is large and the region includes a dark extremum (caused by a shadow); and (3) touching the screen when the brightness variation is large and the region includes a light extremum.

24 Claims, 11 Drawing Sheets

Related U.S. Application Data

(60) Provisional application No. 61/544,983, filed on Oct. 7, 2011.

(51) Int. Cl.
*G06K 9/00* (2006.01)
*G03B 17/54* (2006.01)

(56) References Cited

U.S. PATENT DOCUMENTS

| | | |
|---|---|---|
| 7,599,561 B2 | 10/2009 | Wilson et al. |
| 7,629,967 B2 | 12/2009 | Newton |
| 7,777,899 B1 | 8/2010 | Hildreth |
| 7,800,594 B2 | 9/2010 | Nakamura et al. |
| 8,068,641 B1 | 11/2011 | Hildreth |
| 8,116,518 B2 | 2/2012 | Shamaie et al. |
| 2001/0012001 A1 | 8/2001 | Rekimoto et al. |
| 2005/0110964 A1* | 5/2005 | Bell .................. G06F 3/011 353/122 |
| 2006/0093186 A1 | 5/2006 | Ivanov |
| 2006/0170658 A1 | 8/2006 | Nakamura et al. |
| 2007/0024821 A1* | 2/2007 | Devos .................. G02B 17/08 353/74 |
| 2009/0091710 A1 | 4/2009 | Huebner |
| 2010/0315413 A1 | 12/2010 | Izadi et al. |
| 2011/0115823 A1 | 5/2011 | Huebner |
| 2011/0243380 A1 | 10/2011 | Forutanpour et al. |
| 2011/0254810 A1 | 10/2011 | Lee et al. |
| 2011/0254832 A1 | 10/2011 | Wilson et al. |
| 2011/0267262 A1 | 11/2011 | Gollier |
| 2012/0076353 A1* | 3/2012 | Large .................. G03B 17/54 382/103 |
| 2013/0088461 A1 | 4/2013 | Shamaie |
| 2014/0232695 A1* | 8/2014 | McGaughan ......... G06F 3/0425 345/175 |

FOREIGN PATENT DOCUMENTS

| | | |
|---|---|---|
| JP | 2007514241 A | 5/2007 |
| JP | 2008511069 A | 4/2008 |
| JP | 2011513828 A | 4/2011 |
| JP | 2011118533 A | 6/2011 |
| JP | 5510907 B2 | 6/2014 |
| KR | 101141087 B1 | 7/2012 |
| WO | WO-2006025872 A2 | 3/2006 |

OTHER PUBLICATIONS

International Search Report and Written Opinion—PCT/US2012/059074—ISA/EPO—Feb. 12, 2013.
Prodisplay, "Front Projection Touch Screens", retrieved from http://www.prodisplay.com/front-projection-touch-screens.html on Oct. 3, 2012, 3 pages.

* cited by examiner

VISION-BASED INTERACTIVE PROJECTION SYSTEM

CROSS-REFERENCE TO RELATED APPLICATIONS

This application is a continuation of U.S. application Ser. No. 13/645,390, entitled "VISION-BASED INTERACTIVE PROJECTION SYSTEM", filed Oct. 4, 2012, which claims the benefit and priority of U.S. Provisional Application No. 61/544,983, filed on Oct. 7, 2011, which is hereby incorporated by reference in its entirety for all purposes.

BACKGROUND

Projectors are widely used in schools, trade shows, businesses, museums, and anywhere that a screen is needed to be shown on a large surface. A projector may be coupled to a computer, and may then project computer displays onto a screen. The user is frequently standing near the screen, and not near the computer. Thus, it is difficult to coordinate the computer's operation. An external device may be used, e.g., to progress through slides in a presentation. However, external devices are frequently confusing and of limited utility. It would be advantageous for a system to allow a user to have increased interaction with a projection system.

SUMMARY

Techniques are provided to improve interaction between a user and a projection system. In some embodiments, an image of a user in front of a display screen is captured. An inference can then be made as to whether a user is touching a display screen based on an analysis of shadows and/or variation of brightness (i.e., intensities) across pixels in the image. For example, it may be inferred that the object is: (1) approaching the screen when a region surrounding a top of the object is characterized by a relatively small brightness variation; (2) hovering over the screen when the brightness variation is large and the region includes a dark extremum (caused by a shadow); and (3) touching the screen when the brightness variation is large and the region includes a light extremum.

Lights can be appropriately arranged and configured (e.g., in a projection system) to ensure that the brightness variations are appropriately associated with desired states characterizing the user's interaction with the screen. For example, a projection system can include: projection optics, a front light, a back light and a camera—all embedded in a shared housing. The front light can be configured to illuminate a region in front of the display screen, such that an object (e.g., a fingertip) hovering over the screen is surrounded by substantially no shadow in an image captured during the illumination by the camera. The back light can be configured to illuminate the display screen, such that the object hovering over the screen is surrounded by a shadow in an image captured during the illumination by the camera. The camera can be configured to image the screen during the front-light illumination (to produce a first image) and to further image the screen during the back-light illumination (to produce a second image). The first image can be used to estimate a location of the object, and the second image can be used to infer a state of an object (e.g., by characterizing brightness variation across pixels in a region and/or identification of whether an extremum in the region was bright or dark).

In some embodiments, a method is provided. A display can be projected onto a surface. A region near the surface can be illuminated. An image of the surface can be captured during the illumination. A variation of intensities across pixels in at least a portion of the image can be analyzed. A polarity associated with the portion of the image can be determined. A determination can be made as to whether an object is touching the surface based at least partly on the analysis of the variation and on the determined polarity.

In some embodiments, a projector system is provided. Projection optics can be configured to project a display on a surface. A light source can be configured to emit light in a direction towards the surface. A camera can be configured to capture an image of the surface during the emission of light. An image analyzer can be configured to detect a variation of intensities across pixels in at least a portion of the image and to determine a polarity associated with the portion of the image. A state detector can be configured to determine whether an object is touching the surface based at least partly on the variation detection and the determined polarity.

In some embodiments, a projector system is provided. The projector system can include means for projecting a display onto a surface and means for illuminating a region near the surface. The projector system can also include means for capturing an image of the surface during the illumination and means for analyzing a variation of intensities across pixels in at least a portion of the image. The projector system can further include means for determining a polarity associated with the portion of the image and means for determining whether an object is touching the surface based at least partly on the analysis and on the determined polarity.

In some embodiments, a non-transitory computer-readable medium is provided. The medium can contain instructions which, when executed by a processor, can cause the processor to access an image of a surface on which a display is projected and analyze a variation of intensities across pixels in at least a portion of the image. The instructions which, when executed by the processor, can further cause the processor to determine a polarity associated with the portion of the image and determine whether an object is touching the surface based at least partly on the analysis of the variation and on the determined polarity.

DETAILED DESCRIPTION

Techniques are provided to improve interaction between a user and a projection system. In some embodiments, an image of a user in front of a display screen is captured. An inference can then be made as to whether a user is touching a display screen based on an analysis of shadows and/or variation of brightness (i.e., intensities) across pixels in the image. For example, it may be inferred that the object is: (1) approaching the screen when a region surrounding a top of the object is characterized by a relatively small brightness variation; (2) hovering over the screen when the brightness variation is large and the region includes a dark extremum (caused by a shadow); and (3) touching the screen when the brightness variation is large and the region includes a light extremum.

Lights can be appropriately arranged and configured (e.g., in a projection system) to ensure that the brightness variations are appropriately associated with desired states characterizing the user's interaction with the screen. For example, a projection system can include: projection optics, a front light, a back light and a camera—all embedded in a shared housing. The front light can be configured to illuminate a region in front of the display screen, such that an object (e.g., a fingertip) hovering over the screen is surrounded by substantially no shadow in an image captured during the illumination by the camera. The back light can be configured to illuminate the display screen, such that the object hovering over the screen is surrounded by a shadow in an image captured during the illumination by the camera. The camera can be configured to image the screen during the front-light illumination (to produce a first image) and to further image the screen during the back-light illumination (to produce a second image). The first image can be used to estimate a location of the object, and the second image can be used to infer a state of an object (e.g., by characterizing brightness variation across pixels in a region and/or identification of whether an extremum in the region was bright or dark).

Figure 1:
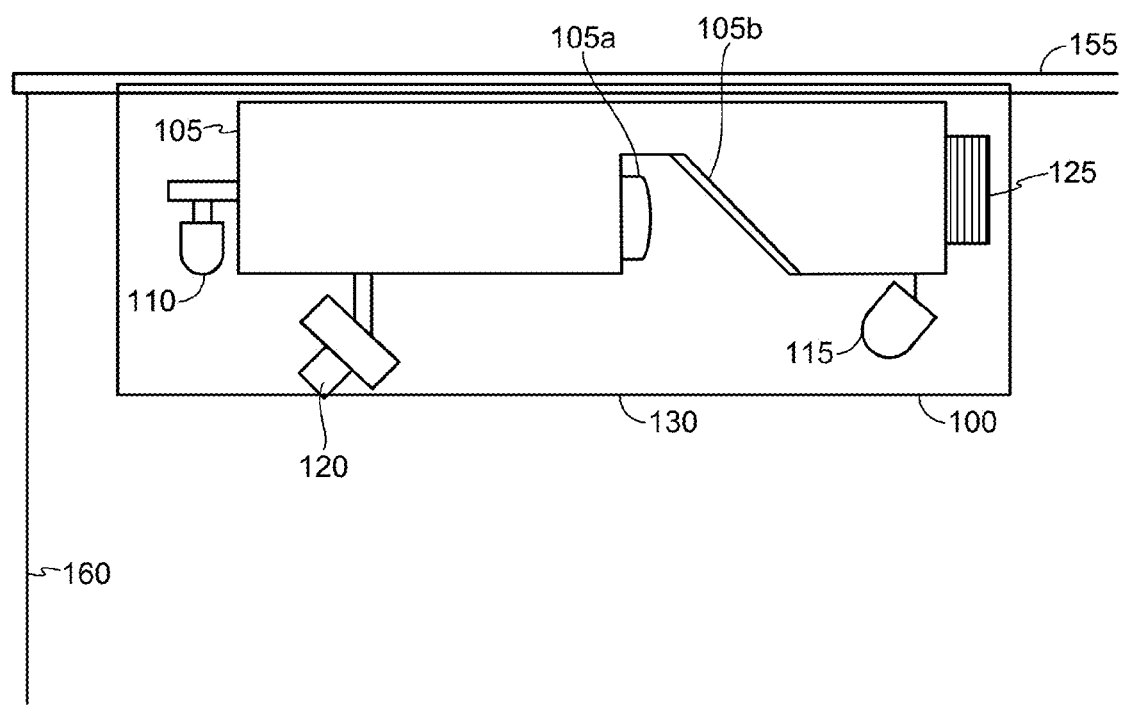
FIG. 1 shows an embodiment of a projection system 100.

FIG. 1 shows an embodiment of a projection system 100. The projection system may include a projector 105. The projector may be configured to project a reference image to a screen, thereby creating a projected image, e.g., projected on a display screen 160. Projector 105 may also be configured to project an image generated in association with an application or program or other aspect of operation of a computer. Display screen 160 may include, e.g., a white board, a pull-down screen, a wall, etc. Display screen 160 may be provided in a set with projection system 100—either being independent and separable to system 100 or being connected to system 100. Display screen 160 may have a substantially rectangular shape and may have a diagonal dimension of at least about, about, or less than about, 1 mm, 1 cm, 10 cm, 100 cm, 1 m, 3 m, 5 m, or 10 m. Display screen 160 may be comprised of a material that is at least partly reflective. In some instances, display screen 160 has a reflectance of at least about 1% or 10% and/or less than about 20% or 40%. Although the term "display screen" is used herein, the display screen is not restricted to elements or components manufactured with the intent that images be displayed thereon. A display screen as used herein may comprise any surface on which light and/or an image may be projected, such as a wall, a floor, a piece of paper, a window, or any other surface. In some embodiments, a surface may be created by steam or condensation. In some embodiments, the surface comprises a user's hand, clothing, or other element associated with the user.

Projector 105 may include, e.g., a short-throw projector. Projector 105 may have a throw ratio (a distance from a projector to a screen divided by a diagonal distance of a projected image) of less than about 1 or less than 0.5. Projector 105 may include projector optics, such as a projector light source 105a and mirror 105b. In some embodiments, projector 105 is an independent device within projection system 100 and/or is housed within a single proctor housing. In other embodiments, projector 105 represents collection of projector optics and/or other projector components that are not separately housed from the rest of projection system 100.

Projection system 100 may include at least one front light source 100 and/or at least one back light source 115, each configured to emit light. The light emitted by one or both of the light sources may be non-visible. In some embodiments, the light emitted by one or both of the light sources comprises or consists of infrared light. One or both of the light sources may comprise one, more or an array of component light sources, such as light-emitting diodes (LED). In one embodiment, back light source 115 comprises a single light source, and front light source 110 comprises an array of component light sources (e.g., LEDs). In some embodiments, a light source comprises a plurality of component light sources positioned with a density such that light emitted from the collection of component light sources appears as a single light source.

Front light source 100 may be positioned in front of projector 105 and/or projection optics 105a and 105b. Front light source 100 may be attached to a front side of projector 105 and/or to a front portion of a bottom side of projector 105. Front light source 100 may be positioned between projector 105 and display screen 160 and/or between back light source 115 and a display screen 160. In some embodiments, front light source 100 is positioned near a front end of projector 105. In some instances, a horizontal separation between display screen 160 and front light source 100 is less than about 1.5 meters.

Front light source 100 may be configured to emit light from projection system 100 in a first direction. In some embodiments, light is initially emitted from front light source 100 in the first direction. In some embodiments, optics are used to direct the initial light to propagate in the first direction. The first direction may comprise a first x-component (e.g., in a direction parallel to display screen 160 and to ceiling 155) and a first y-component. (e.g., in a direction orthogonal to a ceiling 155, floor or other surface that supports system 100)

Front light source 100 and/or optics associated with the light source may be configured such that light emanating from the source and exiting the projection system illuminates an object (e.g., a finger, a hand, or other object, such as a wand, a pointing device, etc.) touching display screen 160. Thus, it may be configured to illuminate a region directly in front of display screen 160. Proper configuration to properly and/or fully illuminate an object of interest may involve appropriately setting, e.g., a position, orientation and/or brightness of light source 100 and/or selection and placement of optics directing light emitted from the light source 110. In some instances, an object touching display screen 160 may reflect some light sourced by front light source 100 that is mirrored on the screen and seen by camera 120. As explained below, this is frequently undesirable in these circumstances. Therefore, brightness, position and orientation of front light source 100 and any associated optics may be configured to reduce or minimize this mirror effect.

Back light source 115 may be positioned near a back of projector 105. Back light source 115 may be positioned behind front light source 100 and/or projection optics 105a and 105b. Back light source 115 may be attached to a back side of projector 105 and/or to a back portion of a bottom side of projector 105.

Back light source 115 may be configured to emit light from projection system 100 in a second direction. In some embodiments, light is initially emitted from back light source 115 in the second direction. In some embodiments, optics are used to direct the initial light to propagate in the second direction. The second direction may comprise a second x-component and a second y-component. The ratio of the second x-component to the second y-component may be larger than a ratio of the first x-component to the first y-component. The ratio of the second x-component to the second y-component may be at least about 0.25, 0.5, 1, 2 or 5. The horizontal separation between front light source 100 and back light source 115 may be at least about 0.1, 0.25, 0.5, 1 or 2 feet. In one embodiment, light emitted from back light source 115 can be projected through a lens of projector 105. For example, a prism may be positioned along an optical path between back light source 115 and a lens of projector 105.

In some instances, an object touching display screen 160 may reflect some light sourced by back light source 115 that is mirrored on screen 160 and seen by camera 120. As explained below, this is frequently desirable in these circumstances. Thus, brightness, position and orientation of back light source 100 and any associated optics may be configured to produce this mirror effect.

Projection system 100 may include a camera 120. Camera 120 may be attached to a bottom of projector 105. Camera 120 may be positioned near a front of projector 105 (e.g., in front of projection optics 105a and 105b). Camera 120 may be positioned between front light source 100 and back light source 115. Camera 120 may be oriented to capture images of a front surface of display screen 160. Camera 120 may comprise a filter, such as an infrared filter, such that it can image display screen 160. In some embodiments, in addition to or instead of camera 120, system 100 includes another type of light sensor such as an IR sensor.

In some instances, an object touching display screen 160 may reflect some light sourced by a light source (110 or 115) that is mirrored on the screen and seen by camera 120. This mirror effect may be undesirable in some circumstances (e.g., when light is emitted from front light source 110) and desirable in other circumstances (e.g., when light is emitted from back light source 115). Camera 120 may be configured (e.g., by setting image-capturing parameters, such as shutter and gain) to minimize, reduce, maintain, enhance or maximize this mirror effect. In some instances, camera configurations (e.g., parameters) change depending on which light source is emitting light (e.g., to reduce the effect when front light source 100 is emitting light and to enhance the effect when back light source 115 is emitting light). In some instances, camera configurations remain constant across conditions, and, e.g., other strategies, such as configuring a light source's position, power and/or orientation may achieve the desired state-specific mirror effect.

Projection system 100 may include a timing circuit 125. Timing circuit 125 may be coupled to one or both of front light source 100 and back light source 115. Timing circuit 125 may control when one or both light sources emit light, e.g., by sending on/off signals, which may control power supplied to each light source. Timing circuit 125 may receive input from camera 120. Thus, for example, timing circuit 125 may be informed when a camera is beginning to or is about to begin imaging display screen 160. Timing circuit 125 may be configured to ensure that only one of light sources 110 and 115 is emitting light at a time and/or such that at least one light source 110 and/or 115 is emitting light during a time interval (i.e., frame) during which camera 120 is imaging display screen 160.

Figure 2:
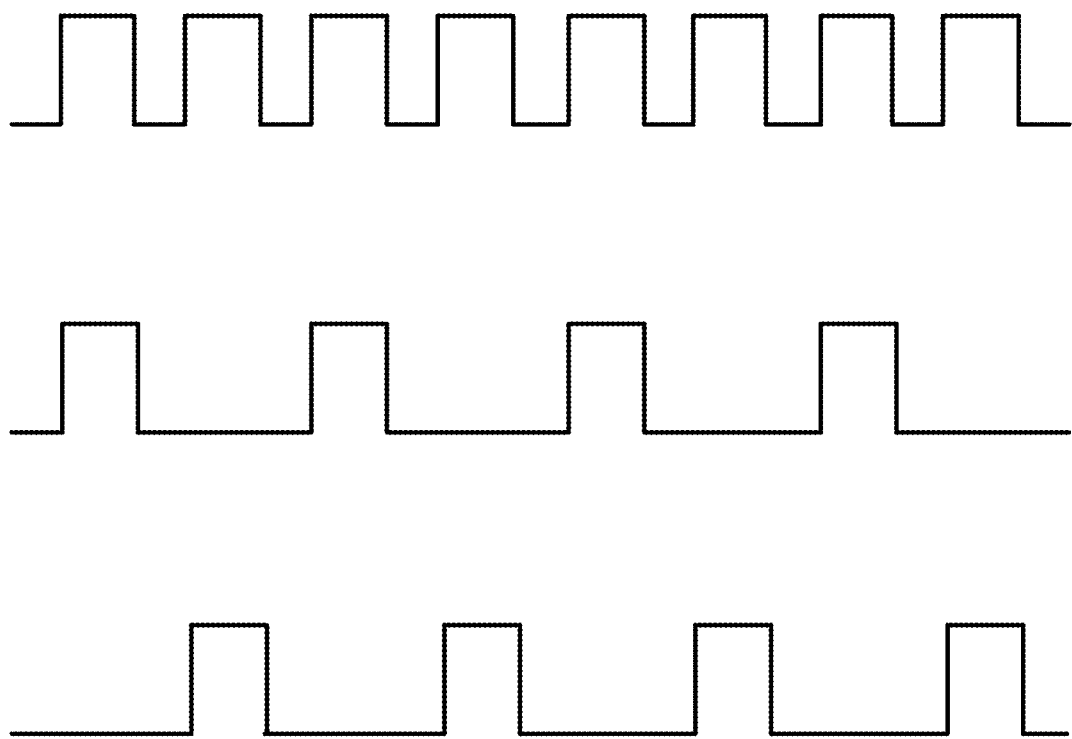
FIG. 2 shows example representations of a timing circuit's inputs and outputs.

In some instances, timing circuit 125 sends alternating on/off signals to the light sources 110 and 115. For example, upon receiving a signal that a camera is imaging a first frame, timing circuit 125 may send an on signal to front light source 110. Upon receiving a signal that the first imaging frame is complete, timing circuit may send an off signal to front light source. Similar signals may be sent at similar times to back light source 115 in association with a second imaging frame. FIG. 2 shows signals representing this embodiment. The top trace represents a camera signal received by timing circuit 125 from camera 120. The middle trace represents a first output of the timing circuit sent to control front light source's light emission. The bottom trace represents a second output of the timing circuit sent to control back light source's light emission. Thus, in this embodiment, light is emitted from one—but only one—of light sources 110 and 115 during each camera frame.

Figure 3:
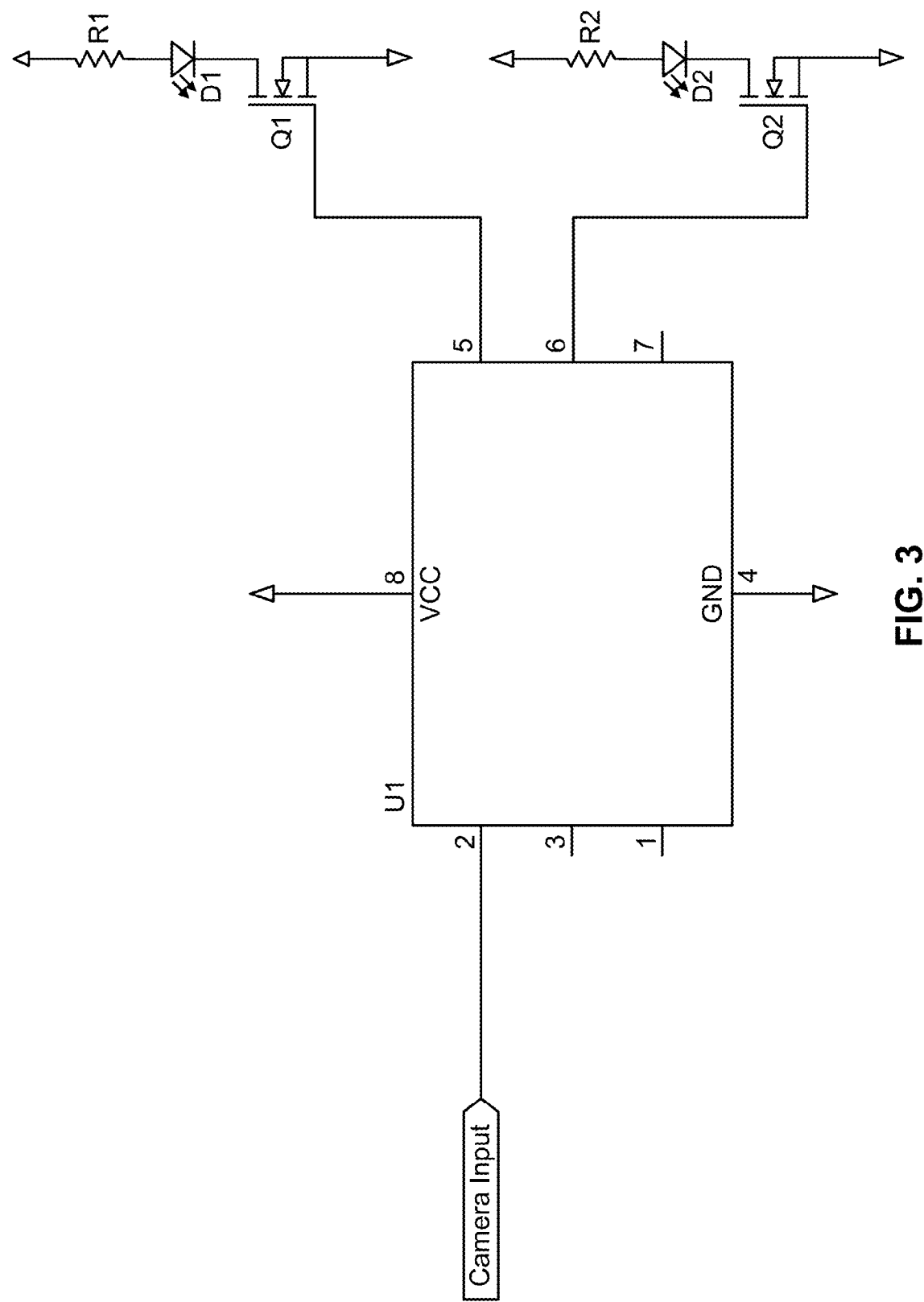
FIG. 3 shows a schematic of one embodiment of a timing circuit.

Timing circuit 125 may include any of a variety of timing circuits. Timing circuit 125 may include, e.g., one or more integrated circuits, resistors, transistors, and/or diodes. Timing circuit 125 may receive one or more inputs from, e.g., camera 120, a clock, and/or a processor. Timing circuit 125 may include one, two or more outputs. FIG. 3 shows a schematic of one embodiment of timing circuit 125.

Projection system 100 may include a housing 130. At least part or most of housing 130 may include a metal or plastic material. Housing 130 may at least partly or fully surround one, more or all of: projector 105, front light source 110, back light source 115, camera 120 and timing circuit 125. In some instances, housing 130 at least partly or fully surrounds all non-housing parts of projection system 100. In some embodiments, housing 130 includes one or more lenses (or openings), e.g., in a bottom and/or front surfaces. These lenses may allow the projection system 100 to emit light from front light source 110, back light source 115, and/or projector light source 105a. A lens may further allow camera 120 to collect external images (e.g., at or in front of display screen 160). In some embodiments, housing 130 comprises one or more surfaces that are at least partly transparent. In some embodiments, one, more or all of: projector 105, front light source 110, back light source 115, camera 120 and timing circuit 125 may be directly or indirectly mechanically coupled together in a configuration that does not include a housing. For example, all of these elements may be secured to an open frame. The term housing is used to describe embodiments that are not only enclosed or partially enclosed, but also to describe embodiments in which elements are openly or loosely mechanically coupled.

As described in more detail below, projection system 100 may also include, e.g., a storage device, a processor, and/or a computer. In some embodiments, projection system 100 includes a transmitter to transmit data (e.g., from camera 120) to an external storage device, processor and/or computer. Projection system 100 may also include a receiver to receive data (e.g., from a clock, external computer, or a user-controlled device). One, more or all of: the storage device, processor, computer, transmitter, and receiver may be partially or fully enclosed in the housing discussed above or otherwise mechanically coupled to one or all of the elements discussed above.

System 100 or a portion thereof may comprise a self-contained unit that may be portable or may otherwise be configured as an integrated unit, for example, when enclosed by the housing discussed above. System 100 may be used to establish a touch screen on virtually any surface in some embodiments. Thus, the system 100 may be carried to a variety of or any location and used to establish a touch-based computer system, for example, with respect to a wall in a conference room or on a table. In some aspects, system 100 is integrated into a mobile device such as a smartphone, and may be configured as a pico projector. In some aspects, front light source 100 and back light source 115 may be disposed side by side or one on top of the other in addition to or instead of being aligned towards the front and back of system 100.

Figure 4:
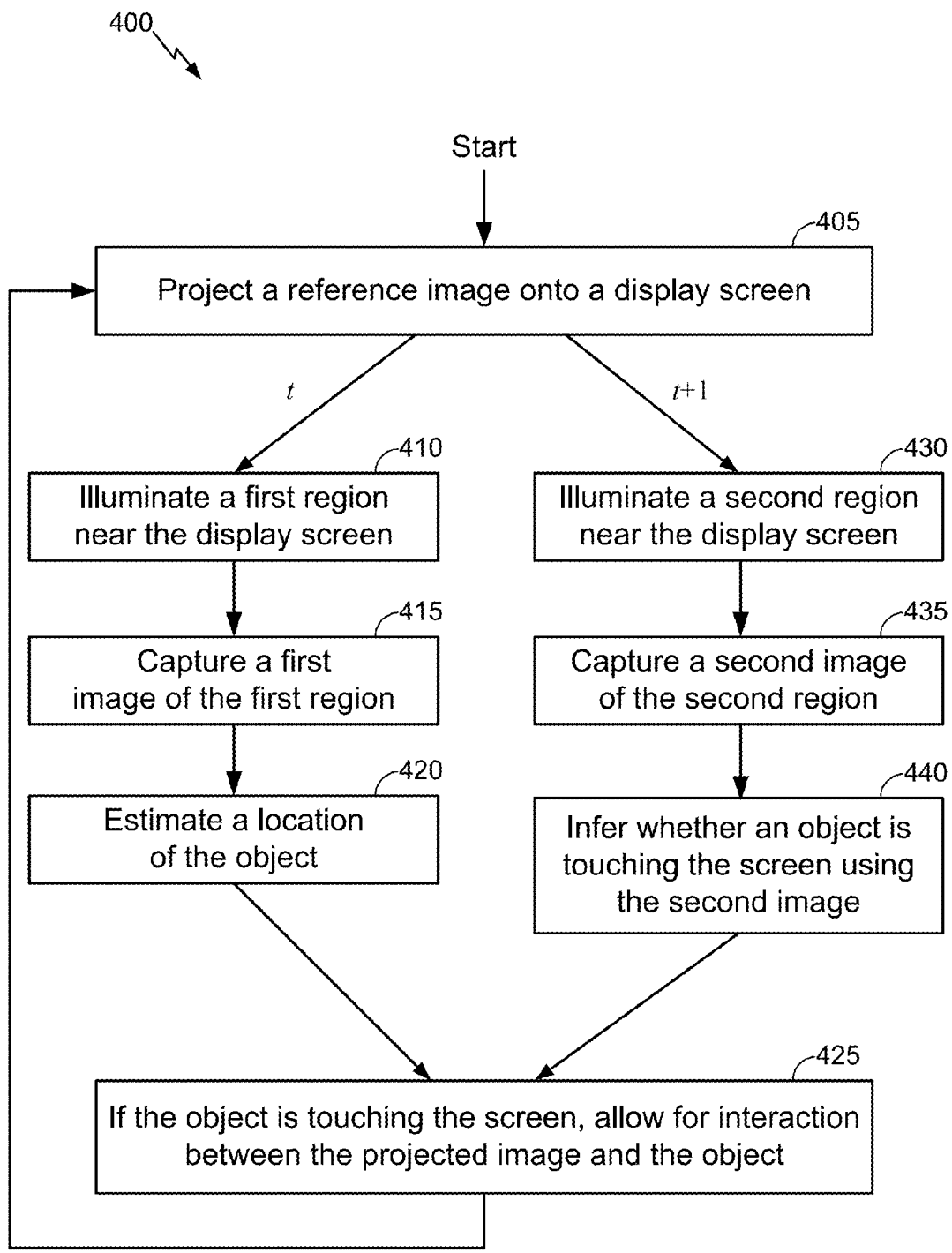
FIG. 4 shows an embodiment of a method for inferring whether an object is touching display screen.

FIG. 4 shows an embodiment of a method 400 for inferring whether an object is touching display screen 160. At 405, a reference image (or, in other words, a display) is projected (e.g., by projector 105) onto display screen 160. The reference image may be, e.g., a digital image stored on and/or transmitted by a computer coupled to projection system 100. The reference image may include, e.g., a presentation slide, a document, a desktop, a user interface, a picture, an animation, etc. Whether process 400 proceeds to block 410 or to block 430 depends on a current time step. In some instances, process 400 initially always proceeds to one of blocks 410 and 425 (e.g., always performing block 410 before block 430). In some instances, process 400 depends on an absolute time.

At 410, a first region near display screen 160 is illuminated (e.g., by front light source 110). The first region may comprise or consist of a region just in front of display screen 160. For example, the illumination may be configured such that a user's finger will likely be illuminated if the user, the user's hand and/or the user's finger is positioned between projection system 100 and display screen 160 and touches display screen 160. In some embodiments, a direction and brightness of the illumination may be configured such that, in an image captured at 415, there is minimal or no shadow surrounding an object in the first region. The illumination may comprise illumination by non-visible light. This first-region illumination may be in addition to light emitted to project the reference image in 400 (which would include emission of visible light).

At 415, a first image is captured of the first region. The first image may be captured by a single camera (e.g., camera 120) or a set of cameras. In some instances, the capturing cameras are at least partly enclosed within a shared outer housing of a projection system 100. The first image may be captured while the first region is being illuminated. In some instances, for example, a shutter of camera 120 is open during a time period substantially the same as the time period during which the first region is being illuminated. Opening the shutter for a longer time period may harm image quality, and opening the shutter for a shorter time period may waste power required to power a light source illuminating the first region. The captured image may include a two-dimensional digital image. The captured image may include part or all of display screen 160.

At 420, an estimation is made as to a location of an object of interest. The location may comprise location or a top of the object, a top of a shadow of the object, or a bright area above the object (produced based on contact between the object and the screen). The location may comprise a two-dimensional location, comprising an x- and y-coordinate. The x- and y-axes may be axes associated with the second image or axes associated with display screen 160. In one instance, the location comprises coordinates that would accurately reflect an object's location only if the object were touching display screen 160. In some instances, the location comprises a three-dimensional location. For example, the location may be estimated based on a set of first images captured simultaneously, or a computer-vision technique may be used to estimate a z-coordinate of an image.

The estimation may be made based at least partly on the first image, such that an object in the first image may be surrounded by little or no shadow. Thus, it may be relatively easy to identify, e.g., a tip of a finger, even regardless as to the object's proximity or contact with display screen 160 in some embodiments. Location-identifying techniques may include, e.g., a computer-vision technique (e.g., feature detection, edge detection, etc.). For example, edges of an object may be used to identify an object's location.

If other analysis has been performed to allow assessment as to whether the object is touching the screen, process 400 may continue to 425, at which interaction between the projected image and the object is allowed. The interaction can depend on the estimated location (e.g., allowing a user to select or move icons projected at the estimated location) in combination with the determination of the whether the object is touching the screen, or on only one of the estimated location or touch determination. Following the allowed interaction or if an assessment as to whether the object is touching the screen cannot yet be made, process 400 returns to block 405, at which the reference image continues to be projected or is refreshed. In some embodiments, a refresh rate of the reference image is independent of the method 400.

Process 400 can then continue to block 430, at which a second region near display screen 160 is illuminated (e.g., by back light source 115). The second region may comprise or consist of a front surface of display screen 160 and/or a region just in front of display screen. For example, the illumination may be configured such that a user's hand will likely be illuminated if he stands between projection system 100 and display screen 160 and touches display screen 160 or hovers his finger close to the screen 160. In some embodiments, a direction and brightness of the illumination may be configured such that, in an image captured at 435, there is a shadow or a predominate shadow surrounding an object in the second region if the object is not touching display screen 160. The illumination may comprise illumination by non-visible light. This second-region illumination may be in addition to light emitted to project the reference image in 400 (which would include emission of visible light).

As shown, the first region and second regions can be illuminated during different, and possibly, non-overlapping time periods. Time circuit 125 may control the time periods during which one or both regions are illuminated. The first and second regions may also comprise different spatial regions, e.g., based on different locations of light sources illuminating the region. Nevertheless, the first and second regions may overlap (e.g., both may illuminate all or part of display screen 160 when no user is in front of the screen).

At 435, a second image is captured of the second region. The second image may be captured by a single camera (e.g., camera 120) or a set of cameras. In some instances, the capturing camera/s are at least partly enclosed within a shared outer housing of a projection system 100. The first and second images may be captured by the same camera (e.g., a single camera inside projection system 100) or set of cameras. The first and second images may be from a same perspective. The second image may be captured while the second region is being illuminated. In some instances, for example, a shutter of camera 120 is open during a time period substantially the same as the time period during which the second region is being illuminated. The captured image may include a two-dimensional digital image. The captured image may include part or all of display screen 160.

The first and second images may be of a substantially similar or the same perspective. In one embodiment, a single imaging device captures both images in a substantially similar or identical manner, the only difference being the time at which the images were captured. In some embodiments, the second image is captured less than about 1, 0.5, 0.1, or 0.05 seconds after the first image is captured.

At 440, an inference is made as to whether an object is touching display screen 160. For example, after the object of interest is located, a region surrounding the location may be analyzed in the second image to assess any shadow surrounding the object. The inference may be made based at least partly, primarily or completely on the second image. For example, if an object (e.g., a fingertip) is not surrounded by a shadow, it may be inferred that the object is touching display screen 160. In some instances, the inference involves assessing a binary query, such as: is the object touching screen 160 or not? In other instances, the query involves more than two possible outcomes, such as: is the object far from screen 160, near screen 160 or touching screen 160, or what portion of the object is touching screen 160 (e.g., determined based on a portion of the object surrounded by little to no shadow)? In some embodiments, it may be determined whether the object is hovering near the screen, for example within a threshold distance of the screen and/or for a threshold amount of time.

At 425, if the object is inferred to be touching the screen, interaction between the projected image and the object may be allowed. For example, a user may be able to select programs, progress through displays, highlight portions of the displayed screen, provide input into a program using a displayed user interface, etc. In some instances, the object (e.g., a user's fingertip) may act substantially as a computer mouse when the object is inferred to be touching the screen. In some instances, display screen 160 acts substantially as a track pad when the object is inferred to be touching the screen. For example, an estimation of an object's location and an inference of screen contact may allow for an inference as to whether the object is touching the screen, tapping the screen, dragging along the screen, and/or being removed from the screen. A program may associate object actions with specific commands (e.g., to select a program, change views, etc.).

Any portion of the method depicted in FIG. 4 may be repeated. For example, while a single or set of reference images are projected, first and second regions may be repeatedly illuminated (e.g., during distinct time periods). Images may be repeatedly captured. An estimation as to an object's location and an inference as to whether it is touching screen 160 may also be repeatedly made. Arrows indicating repeated actions in FIG. 4 are for example only. It is understood that the method may include a different repetition. Further, it will be understood that, e.g., process 400 can include the performance of blocks 410-420 before performance of blocks 430-440 or the reverse.

Figure 5:
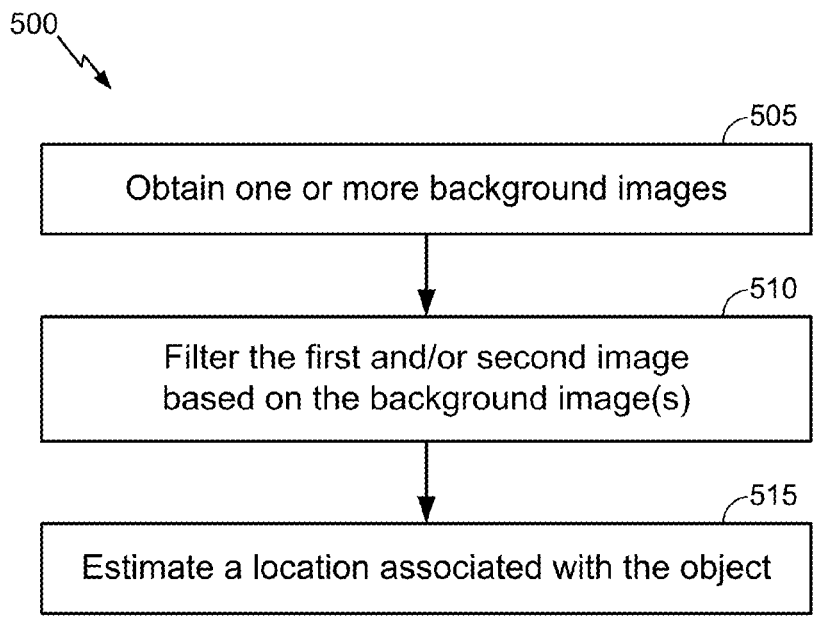
FIG. 5 shows an embodiment of a method for estimating a location of an object.

FIG. 5 shows an embodiment of a method 500 for estimating a location of an object (e.g., as in 430 of FIG. 4). At 505, one or more background images are obtained. A background image may be substantially similar to the first image and/or to the second image (e.g., the first image captured in 415 of FIG. 4), except that no object is in the background image. For example, the background image(s) may be captured using a same camera/s, having same settings, from a same perspective, and/or with substantially similar illumination as present during capture of the first/second image. In one instance, a first background image is captured with conditions (e.g., settings, perspective, illumination, etc.) similar to those used or those that will likely be used to capture the first image. A second background image may be captured with conditions (e.g., settings, perspective, illumination, etc.) similar to those used or that will be used to capture the second image.

The background image(s) may have been captured during a control condition when no object was present. The background image(s) may have been specifically captured to act as a control (e.g., after having instructed a user to prepare a scene for the capture of the image) or it may have been taken without a user's knowledge. For example, projection system 100 may repeatedly image a scene from a single perspective. A technique, such as determining brightness variability or assessing whether there is any above-threshold difference (e.g., a cumulative sum of absolute differences in pixel-paired intensities, the sum being across pixels) across successive images, may be used to identify an image in which it is likely that no object is in front of screen 160. It will be appreciated that the terms brightness, intensity and luminance are used interchangeably herein when used with respect to analysis of an image.

At 510, the first and/or second image is filtered based on the (e.g., respective) background image(s). In one instance, a first image is filtered based on a corresponding first background image, and a second image is filtered based on a corresponding second background image. For example, a two-dimensional brightness map from the background image(s) ($B_{x,y}$) may be subtracted from a similar map of the first and/or second image ($I_{x,y}$). A noise threshold, e, may be set, such that the filtered image only includes non-zero values at pixels for which a difference between the first and/or second image and the background image exceeded the threshold. This process may be represented as follows:

$$j_{x,y} = \begin{cases} I_{x,y} - B_{x,y} & \text{if } |I_{x,y} - B_{x,y}| > \varepsilon \\ 0 & \text{otherwise} \end{cases}$$

Additional or alternative filtering techniques may be applied. For example, a first, second and/or background image may be scaled by a scalar or adjustable scalar. For example:

$$B_f = \left\{ \frac{I_{x,y}}{v} \,\middle|\, v \neq 0, 1 \leq x \leq \text{Width}, 1 \leq y \leq \text{Height} \right\}$$

$$j_f = \begin{cases} \frac{I_{(x,y)}}{v} - B_{f(x,y)} & \text{if } \left|\frac{I_{(x,y)}}{v} - B_{f(x,y)}\right| > \varepsilon \\ 0 & \text{otherwise} \end{cases}$$

Such scaling may be less advantageous or unnecessary if camera settings may be adjusted before capturing different images. The filtering at 510 may produce a filtered image (j) that does not include static objects, such as a screen, a podium, etc.

At 515, a location associated with the object may be estimated, e.g., based on the filtered image. Various computer-vision techniques (e.g., edge detection or feature detection) may be used to identify the object's location.

In some instances, a top non-zero pixel or the top pixel exceeding a threshold in the filtered image is identified. If multiple columns include a pixel meeting the desired criteria in a same top row, a single top pixel may be identified by, e.g., choosing a left-most, center or right-most column. In one embodiment, the top pixel is identified by searching for a first non-zero or above-threshold pixel while scanning from a top-left corner of the image to the bottom-right corner. The top pixel may itself represent the estimated location or may serve as an intermediate variable used to estimate the location. For example, after the top pixel is identified, an extremum position within an area (e.g., a rectangle) surrounding the top pixel may be identified. Thus, for example, it may be determined that a top pixel has coordinates (15, 60). An extremum pixel within a rectangular block extending from (10,55) to (20,65) may then be identified as the estimated location.

Figure 6A:
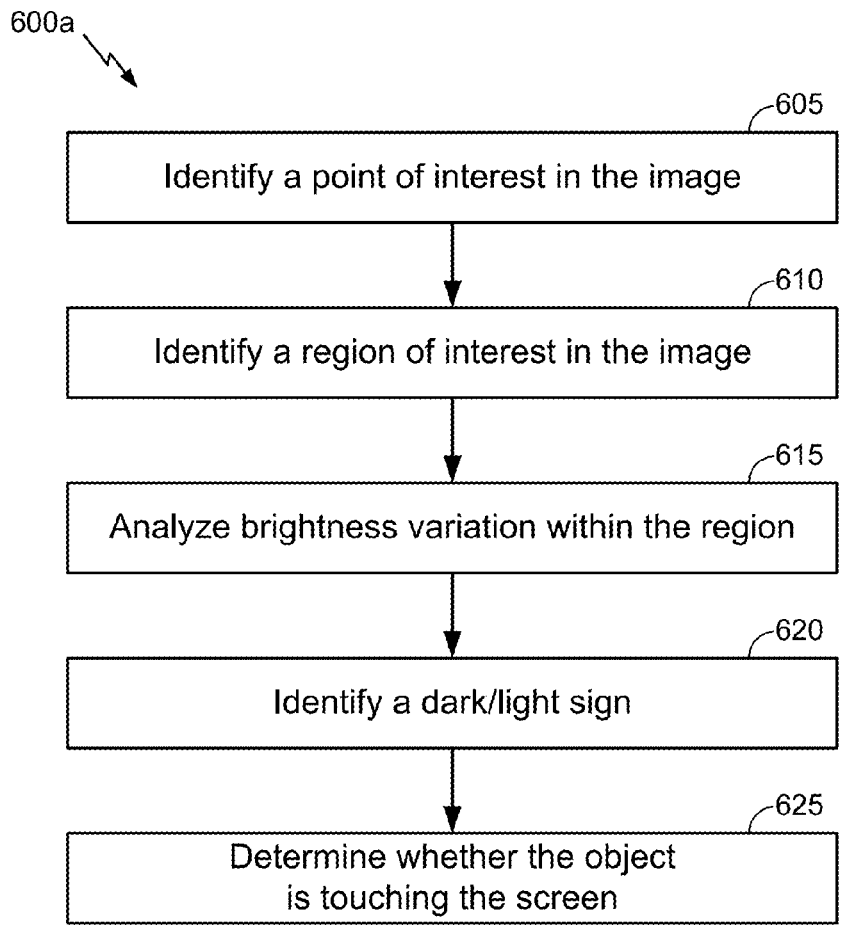
FIGS. 6a-6b show embodiments of methods for determining whether an object is touching the screen.

FIG. 6*a* shows an embodiment of a method 600*a* for determining whether an object is touching the screen (e.g., as in 440 of FIG. 4). At 605, a point of interest in an image (e.g., in second image captured in 425 of FIG. 4) may be identified. The point of interest may include the location estimated to be associated with the object in FIG. 5. For example, the point of interest may comprise a pixel estimated to correspond to a top of the object (e.g., a top of a fingertip).

At 610, a region of interest may be identified. The region may include an area surrounding the point of interest. For example, the region may include a rectangular region surrounding the point of interest.

At 615, brightness variation within the region is analyzed. When an object is casting shadows (hovering) over the screen, the brightness variation may be large due to dramatic differences between a shadow's dark brightness values and the object's brightness values. When the object approaches the screen, most pixels may represent the object, causing relatively low brightness variations. When the object touches the screen, a bright border may form at the top of the object, thereby again increasing the brightness variations.

The analysis may include computing a standard deviation or variance of brightness values within the region. In one embodiment, a plurality of variation measures (e.g., standard deviations or modified standard deviations) are calculated—each associated with a different portion of the region (e.g., a different column of pixels). In one embodiment, the variation measures comprise modified standard deviations, which are not divided by an n-value (number of elements); this modification may reduce the measurements' susceptibility to varying block sizes. A single combined variation measure may be calculated based on the plurality of variation measures (e.g., equal to a median or mean of the plurality of variation measures). The combined variation measure may be scaled, e.g., to account for a size of the analyzed region.

A mathematical representation is shown below. In this embodiment, a filtered image is calculated by subtracting a background image's (e.g., brightness) values from, e.g., a second image (described above). The filtered image is set to zero if the difference is below a noise threshold, $\epsilon$. A top block, K, surrounding a location of interest, (i,j) is analyzed. Modified standard deviations are computed for each column, $\sigma_i$. The modified standard deviations are then averaged to compute a time-dependent combined variation measure, $a_t$.

$$\Delta = \{\delta_{x,y} \mid 1 \le x \le \text{width}, 1 \le y \le \text{height}\}$$

$$\delta_{x,y} = \begin{cases} I_{x,y} - B_{x,y} & \text{if } |I_{x,y} - B_{x,y}| \ge \varepsilon \\ 0 & \text{otherwise} \end{cases}$$

$$K = \text{TopBlock}(\Delta_t)$$

where $$K = \left\{ k_{i,j} \mid x_k - \frac{l_1}{2} \le i \le x_k + \frac{l_1}{2}, y_k - \frac{l_2}{2} \le j \le y_k + \frac{l_2}{2} \right\}$$

$$\sigma_i = \sqrt{N \cdot E[(K_i - \mu_i)^2]}$$

where $$K_i = \left\{ k_{i,j} \mid i = c, y_k - \frac{l_2}{2} \le j \le y_k + \frac{l_2}{2} \right\}$$

$$a_t = \frac{1}{l_1} \sum_{1}^{l_2} \sigma_i$$

The average standard deviation may be used, e.g., to determine whether an object is approaching a screen. Specifically, a low average standard deviation can be used to infer that an object is approaching the screen and not hovering over the screen (in which case the object would be surrounded by a shadow) or contacting the screen (in which case the object would be surrounded by a bright spot). However, the average standard deviation may not distinguish between these two latter instances in all embodiments.

At 620, a dark/light sign is identified. The sign may indicate, e.g., whether an extremum point (or an average of a top n number of points with regard to intensity) within the region and/or the point of interest is associated with a "dark" intensity value or a "light" intensity value. For example, a darkness sign may be identified when a brightness of the point of interest is below a threshold or below an average brightness value. A light sign may be identified when a brightness of the point of interest is above a threshold or above an average brightness value. As another example, a skew of intensity distributions can be used to determine the sign.

A threshold can be determined based on a surface on which an image is being displayed, ambient light, skin color, a color of a control object, or an image or display being projected. A threshold can be determined by determining a distribution of intensity values and setting the threshold to a value for which a given number of the intensity values are below or above. For example, a threshold for determining a dark sign can be determined by accessing a distribution of intensity values for an image being projected, and setting the threshold such that 20% of the accessed values fall below the threshold. A threshold may be fixed or variable. For example, a threshold could vary depending on the image being projected or an average off-screen instantaneous intensity.

Figure 7:
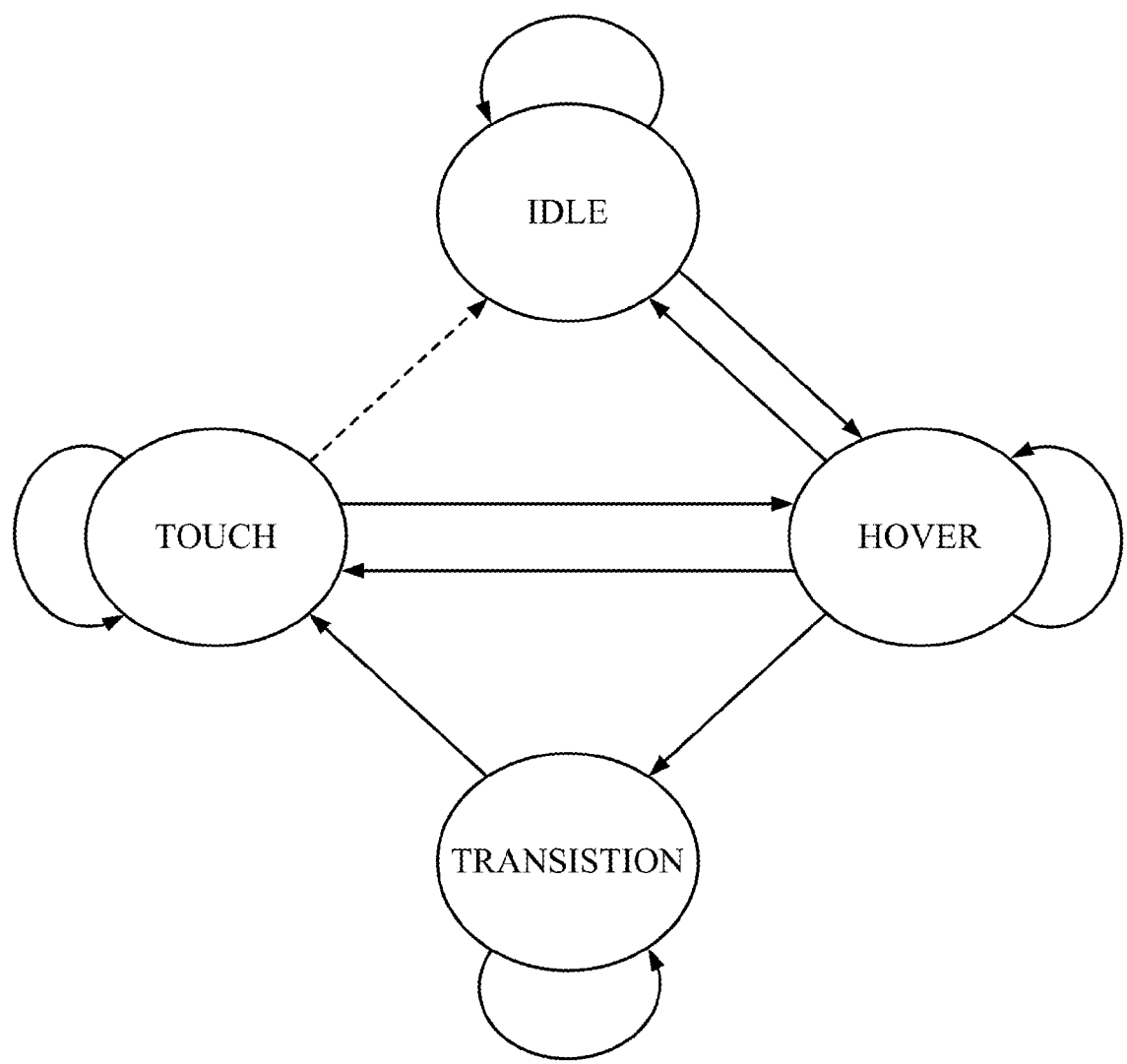
FIG. 7 shows an example of a state machine that can track changes in situations when an object approaches the screen.

At 625, a determination is made as to whether the object is touching the screen. The table below indicates variation measures and dark/light signs that are associated with various states. Thus, based on the variation measure determined at 615 and the dark/light sign determined at 620, a state of an object (e.g., hovering, approaching the screen, or touching the screen) may be determined. FIG. 7 shows an example of a state machine that can track changes in situations when an object approaches the screen.

| State | Variation Measure | Dark/Light Sign |
|---|---|---|
| Hover | High | Dark |
| Approaching Screen | Low | n/a |
| Touching Screen | High | Light |

Figure 6B:
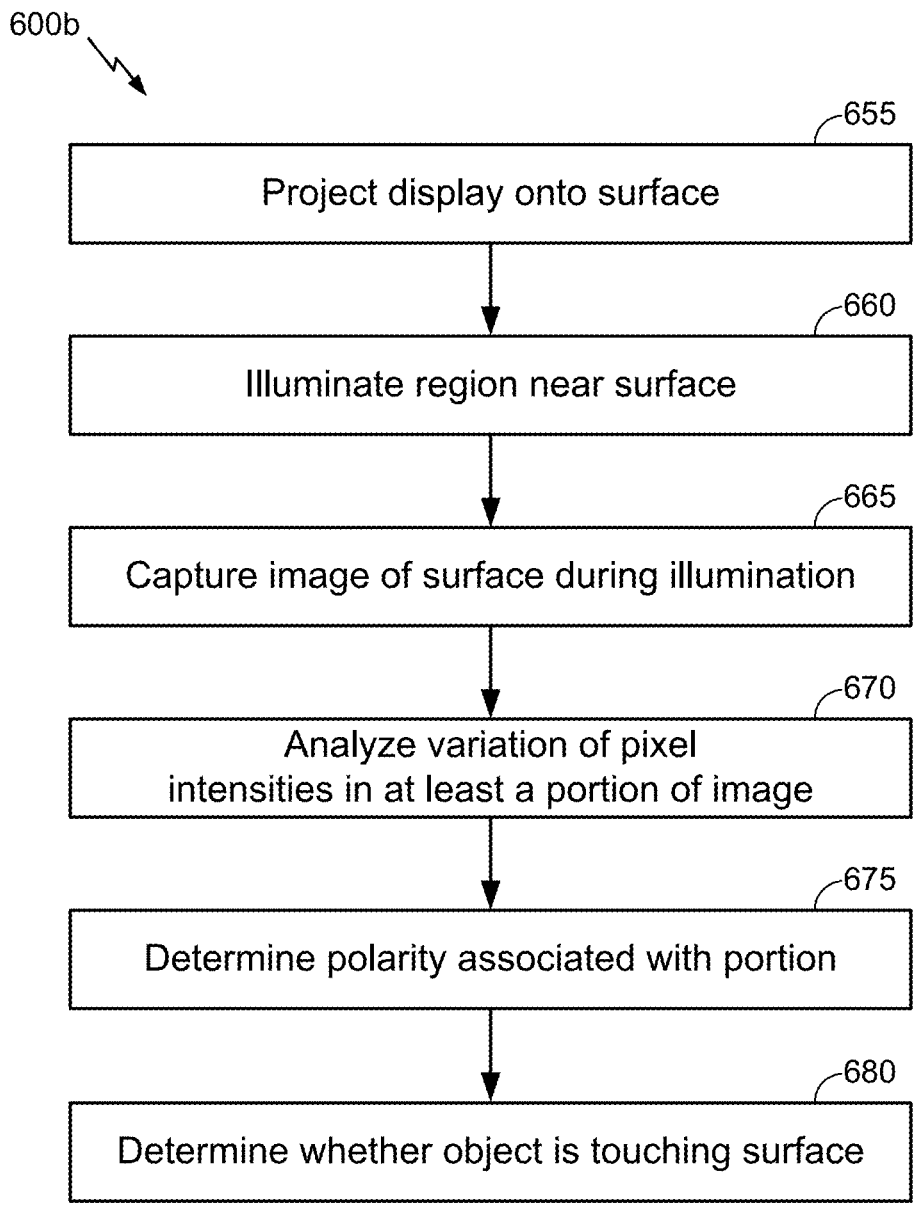

FIG. 6b shows an embodiment of another method 600b for determining whether an object is touching the screen (e.g., as in 440 of FIG. 4). At 655, a display is projected onto a surface. Block 655 can include embodiments similar to embodiments described with respect to block 405. For example, the display can be projected by a projector onto a display screen and can be a digital image (e.g., a presentation slide, a document, a desktop, a user interface, a picture, an animation, etc.).

At 660, a region near the surface is illuminated. Block 660 can include embodiments similar to embodiments described with respect to block 430. For example, the region can comprise or consist of a front surface of the surface and/or a region just in front of the surface, and the illumination can be configured such that a user's hand will likely be illuminated if he stands between a projector projecting the display and the surface and touches surface. The illumination may comprise illumination by non-visible light. This second-region illumination may be in addition to light emitted to project the reference image in 400 (which would include emission of visible light). Thus, the region near the surface may be illuminated at 660 while the display is being projected onto the surface in 655.

At 665, an image of the surface is captured during illumination. Block 665 can include embodiments similar to embodiments described with respect to block 435. At 670, variation of intensities of pixels in at least a portion of the image is analyzed. Block 670 can include embodiments similar to embodiments described with respect to block 615. For example, the analysis may include computing one or more (traditional or modified) standard deviation or variance of brightness values within the region.

At 675, a polarity associated with the portion is determined. Block 675 can include embodiments similar to embodiments described with respect to block 620. For example, determining the polarity can include identifying a sign of an extremum in the region, identifying a direction of a skew of a distribution of intensity values from the region or comparing an extremum in the region to a threshold.

At 680, a determination is made as to whether the object is touching the surface based at least in part on the analysis of the variation of intensities of the pixels and on the determined polarity. Block 680 can include embodiments similar to embodiments described with respect to block 625. For example, it may be determined that the object is touching the surface when the portion includes a high variation in pixel intensities and a polarity is high or light. In some embodiments, the determination of whether the object is touching the surface may affect operation of an application, for example an application associated with the display being projected in 655.

Figure 8:
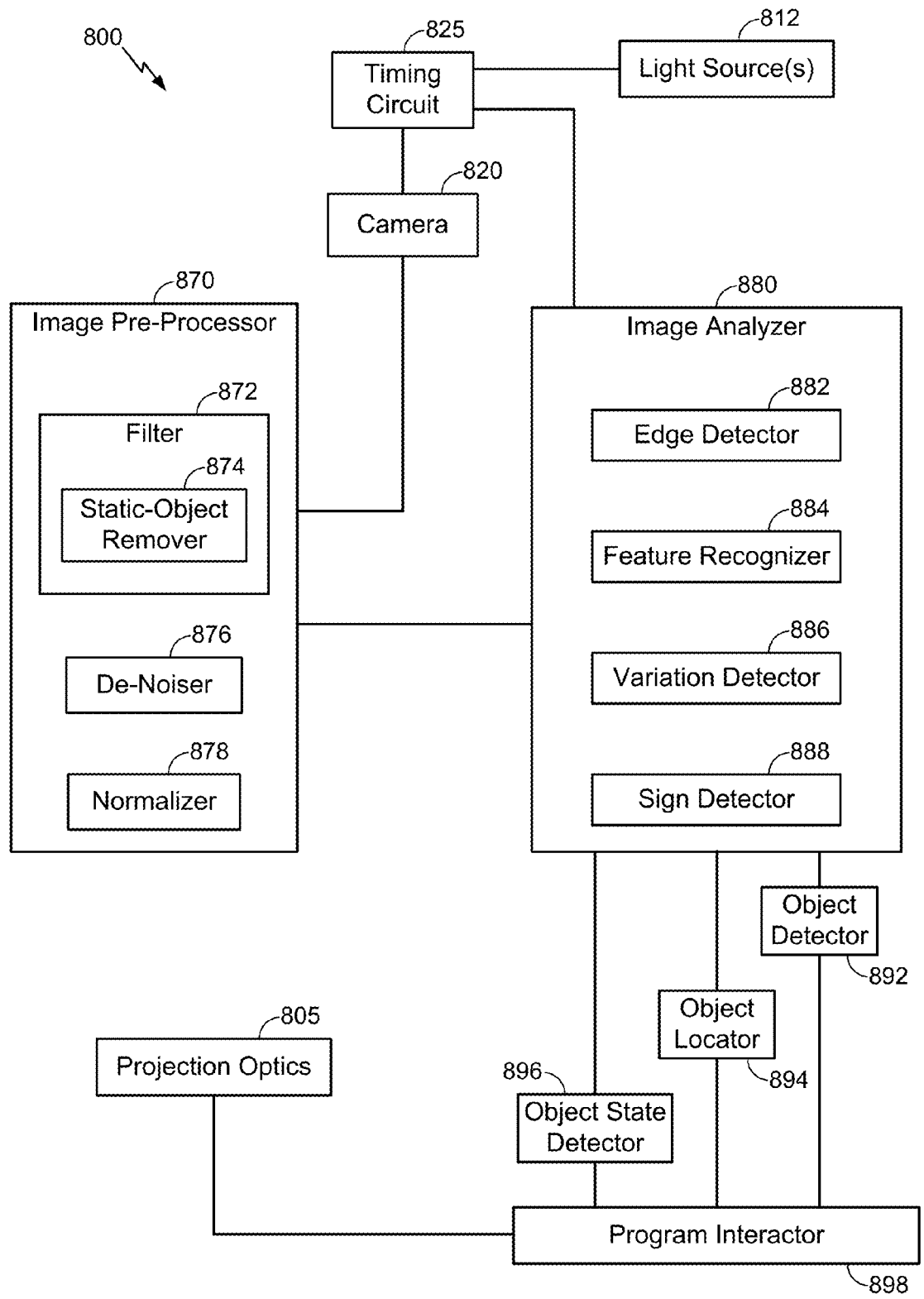
FIG. 8 shows an example of a projection system.

FIG. 8 shows one embodiment of a projection system 800. The components shown in FIG. 8 may be parts of a single or multiple devices. For example, some components may be parts of a projector, while other components may be parts of an independent (coupled or non-coupled) computer. It is understood that, in some embodiments, one or more depicted components may be omitted from the system and/or additional components may be added to the depicted system.

System 800 includes a camera 820 (e.g., camera 120), one or more light sources 812 (e.g., front light source 100 and/or back light source 115), and timing circuit 825 (e.g., timing circuit 125). Camera 820 may capture images of a region at or near a display screen. One or more light sources 812 may illuminate a region at or near the screen. Light source(s) 812 may emit non-visible (e.g., infrared) light. Camera 820 and light source(s) 812 may be coupled, such that images are captured while light is emitted. In one embodiment, camera 820 is coupled to light source (s) 812 via timing circuit 825. In embodiments in which light source(s) 812 includes a plurality of lights, timing circuit 825 may also or alternatively coordinate the emission of these lights (e.g., such that they emit light during substantially non-overlapping time periods).

Images captured by camera 820 may be processed and/or analyzed. In one embodiment, images are input to image pre-processor 870. Image pre-processor 870 may include, e.g., a filter 872. Filter 872 may filter out particular spatial frequencies, enhance the image, crop the image, add or subtract an intensity value (e.g., a mean intensity) to all pixels, etc. In some instances, filter 872 includes a static-object remover 874. Static-object remover 874 may filter out parts of the captured image not of interest (e.g., inanimate objects, the screen, objects that have not moved within a given time period, etc.). In some instances, static-object remover 874 uses a control image to perform this filtering. For example, an image comprising only the screen or with no people in the image may be subtracted from subsequent images. As another example, the control image comprises an average of multiple images (e.g., such that only static objects remain pronounced in the control image). Pre-processor 870 may include a de-noiser 876. De-noiser 876 may, for example, identify pixels with values (e.g., brightness values) insufficiently different from corresponding values in a control image. Values for these pixels may then be set to zero. Pre-processor 870 may include a normalizer 878. For example, normalizer 878 may attempt to control for environmental lighting. Thus, for example, it may be predicted that particular pixels will always be unobstructed. A filtered image may then be adjusted such that pixels at these values are equal to identified values or within identified ranges.

Pre-processed images may be analyzed by one or more image analyzer(s) 880. In some embodiments, the analysis performed by image analyzer 880 depends on characteristics associated with an image at issue. For example, analysis of an image obtained while a front light source was emitting light may differ from analysis of an image obtained while a second light source was emitting light. Image analyzer 880 may include an edge detector 882. Edge detector 882 may, e.g., identify lines and/or pixel variations to identify edges. The edges may be edges associated with an object (e.g., a fingertip), an object's shadow and/or a brightness border around the object.

Image analyzer 880 may include a feature recognizer 884. Feature recognizer 884 may recognize features in general or particular types of features. For example, feature recognizer 884 may identify that a scene includes two features (e.g., which may correspond to an object and a shadow). In some embodiments, feature recognizer 884 may particularly recognize whether a scene includes an object, such as a fingertip. Feature recognizer 884 may analyze an image's brightness, brightness variation, brightness correlations, etc.

Image analyzer 880 may include variation detector 886. Variation detector 886 may identify, e.g., a variation, range or standard deviation of pixel values (e.g., pixel brightness values). Variation detector 886 may identify a variable output as an absolute or scaled value (e.g., a percentage). Variation detector 886 may analyze pixels across an entire image or within a portion of the image (e.g., surrounding a location associated with an object).

Image analyzer 880 may include sign detector 888. Sign detector 888 may analyze whether the image includes a dark feature (e.g., a fingertip's shadow) or a bright feature (e.g., a bright spot on top of a fingertip touching a screen). Sign detector 888 may analyze an entire image or a portion of the image (e.g., surrounding a location associated with an object). Sign detector may identify a sign of one or more extremum pixels or the sign of a median, mean or mode pixel in the region.

Image analyzer 880 may be coupled to an object detector 892, an object locator 894 and/or an object state detector 896. Object detector 892 may detect whether an object (in general or a specific object, such as a fingertip) is present in an image. Object locator 894 may estimate a location of an object. Object state detector 896 may infer a state of an object (e.g., hovering, idle, touching a screen, or approaching a screen). Object detector 892, object locator 894 and/or object state detector 896 may be coupled to program interactor 898. For example, a user may be able to interact with a program only when an object is detected and is detected as being in a particular state (e.g., touching a screen). A type of interaction may depend on a location of the object (e.g., such that a program responds differently depending on a location of a user's hand on a screen). Program interactor 898 may be coupled to projection optics 805 (e.g., projection optics 105), such that, e.g., what is displayed by the optics depends on an object's presence, location and/or state. Thus, projection optics 805 or other such projection elements may be used to project images or other representations of a state or operation of a program or application or computer system. The user may interact with the program, application, or computer system by touching a surface on which the images or representations are projected or displayed. For example, when system 800 detects that a user touches a surface on which an image is displayed, the system may treat the touch as a clicking event (similar to how a user may use a mouse). The user may therefore select objects displayed on the surface by touching them. Further the user may touch the surface and drag his finger across the surface to create a selection box, or the user may touch an object and drag his finger across the surface to move the object, for example. Those of skill in the art will appreciate that the surface may therefore be operated as a touch-screen device, even when the system 800 is remote from the surface and the surface comprises no electronic components. In this way, a determination of whether a user or other object is touching the surface and/or a location of the object or touch may be provided and/or used as an input to an application or computer process, for example based on an image or other display being projected. In some embodiments, the application may be running on or implemented by the system 100 or 800. In some embodiments, the application may be running on a computer coupled to the system 100 or 800, and input may be provided to the computer system via a communication interface.

Figure 9:
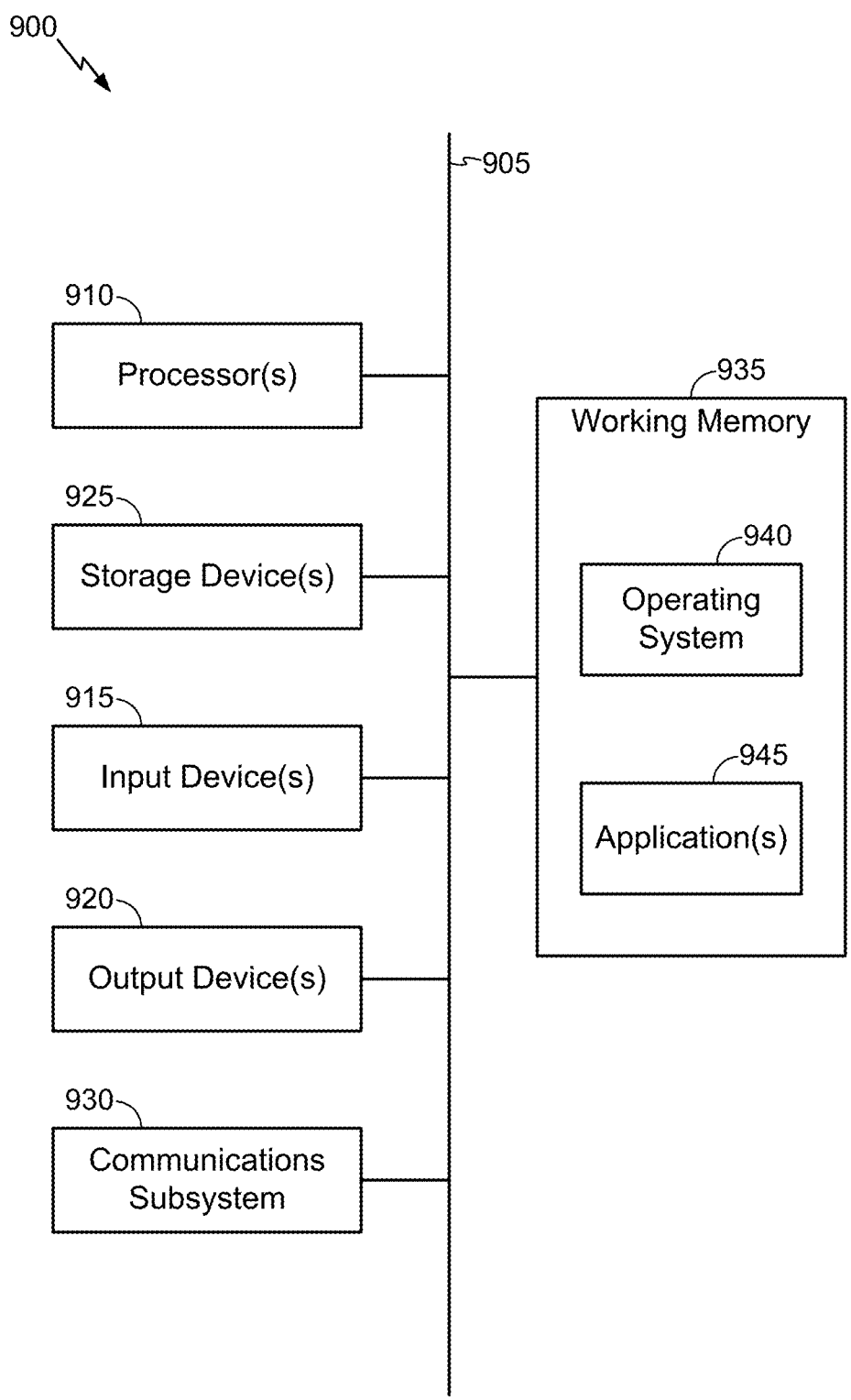
FIG. 9 provides a schematic illustration of one embodiment of a computer system.

Projection system 100 or 800 may include and/or be coupled to a computer system. For example, projection system 100 may be coupled to a computer system that controls what images are to be displayed on display screen 160. An internal or external computer may also be used to determine, e.g., a location of an object and/or whether the object is touching the screen. FIG. 9 provides a schematic illustration of one embodiment of a computer system 900 that can, e.g., perform all or part of methods described herein the methods described herein. Any or all of computer system 900 may be incorporated in projection system 100 and/or coupled (e.g., through a wireless or wired connection) to projection system 100. FIG. 9 is meant only to provide a generalized illustration of various components, any or all of which may be utilized as appropriate. FIG. 9, therefore, broadly illustrates how individual system elements may be implemented in a relatively separated or relatively more integrated manner.

The computer system 900 is shown comprising hardware elements that can be electrically coupled via a bus 905 (or may otherwise be in communication, as appropriate). The hardware elements may include one or more processors 910, including without limitation one or more general-purpose processors and/or one or more special-purpose processors (such as digital signal processing chips, graphics acceleration processors, and/or the like); one or more input devices 915, which can include without limitation a mouse, a keyboard and/or the like; and one or more output devices 920, which can include without limitation a display device, a printer and/or the like.

The computer system 900 may further include (and/or be in communication with) one or more storage devices 925, which can comprise, without limitation, local and/or network accessible storage, and/or can include, without limitation, a disk drive, a drive array, an optical storage device, solid-state storage device such as a random access memory ("RAM") and/or a read-only memory ("ROM"), which can be programmable, flash-updateable and/or the like. Such storage devices may be configured to implement any appropriate data stores, including without limitation, various file systems, database structures, and/or the like.

The computer system 900 might also include a communications subsystem 930, which can include without limitation a modem, a network card (wireless or wired), an infrared communication device, a wireless communication device and/or chipset (such as a Bluetooth™ device, an 802.11 device, a WiFi device, a WiMax device, cellular communication facilities, etc.), and/or the like. The communications subsystem 530 may permit data to be exchanged with a network (such as the network described below, to name one example), other computer systems, and/or any other devices described herein. In many embodiments, the computer system 900 will further comprise a working memory 935, which can include a RAM or ROM device, as described above.

The computer system 900 also can comprise software elements, shown as being currently located within the working memory 935, including an operating system 940, device drivers, executable libraries, and/or other code, such as one or more application programs 945, which may comprise computer programs provided by various embodiments, and/or may be designed to implement methods, and/or configure systems, provided by other embodiments, as described herein. Merely by way of example, one or more procedures described with respect to the method(s) discussed above might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a computer-readable storage medium, such as the storage device(s) 925 described above. In some cases, the storage medium might be incorporated within a computer system, such as the system 900. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 900 and/or might take the form of source and/or installable code, which, upon compilation and/or installation on the computer system 900 (e.g., using any of a variety of generally available compilers, installation programs, compression/decompression utilities, etc.) then takes the form of executable code. In some embodiments, system 900 or components thereof are included within a housing of system 100 or 800, or may otherwise be mechanically coupled thereto. For example, the one or more processors 910 may comprise one or more of image pre-processor 870, image analyzer 880, object detector 892, object locator 894, object state detector 896 or program interactor 898.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer system 900) to perform methods in accordance with various embodiments of the invention. According to a set of embodiments, some or all of the procedures of such methods are performed by the computer system 900 in response to processor 910 executing one or more sequences of one or more instructions (which might be incorporated into the operating system 940 and/or other code, such as an application program 945) contained in the working memory 535. Such instructions may be read into the working memory 935 from another computer-readable medium, such as one or more of the storage device(s) 925. Merely by way of example, execution of the sequences of instructions contained in the working memory 935 might cause the processor(s) 910 to perform one or more procedures of the methods described herein. For example, one or more processors 910 can perform blocks 420, 425, and/or 440 of process 400; blocks 505, 510 and/or 515 of process 500; blocks 605, 610, 615, 620 and/or 625 of process 600a and/or blocks 670, 675, and/or 680 of process 600b. Further, the one or more processors 910 may instruct and/or cause one or more other elements, such as the projector 105, the light source 110, the light source 115, and/or the camera 120, for example, to perform blocks 405, 410, 415, 430, and/or 435 of process 400; and/or blocks 655, 660, and/or 665 process 600b.

The terms "machine-readable medium" and "computer-readable medium," as used herein, refer to any medium that participates in providing data that causes a machine to operate in a specific fashion. Computer readable medium and storage medium do not refer to transitory propagating signals. In an embodiment implemented using the computer system 900, various computer-readable media might be involved in providing instructions/code to processor(s) 910 for execution and/or might be used to store such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 925. Volatile media include, without limitation, dynamic memory, such as the working memory 935.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, etc.

Examples

Figure 10A:
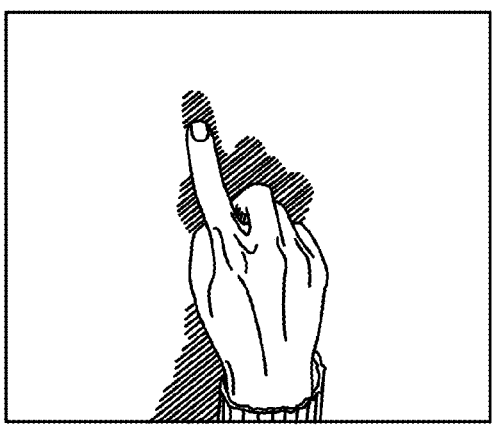
FIGS. 10a-10c show images associated with an example situation in which a hand is hovering over a screen while a back light source is illuminating the scene.
Figure 10B:
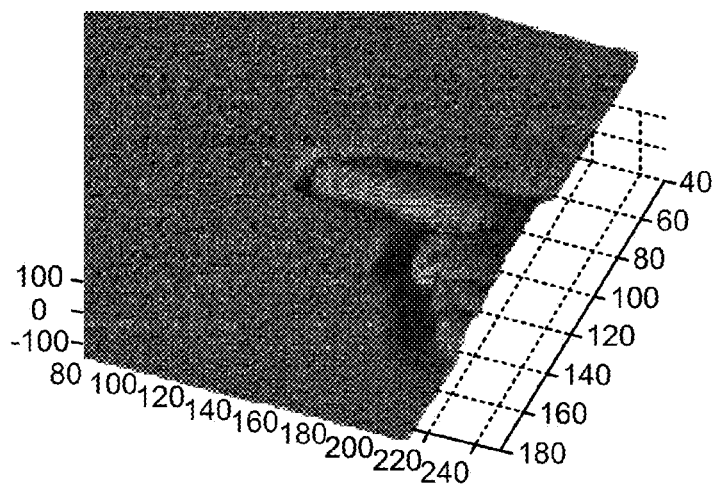
Figure 10C:
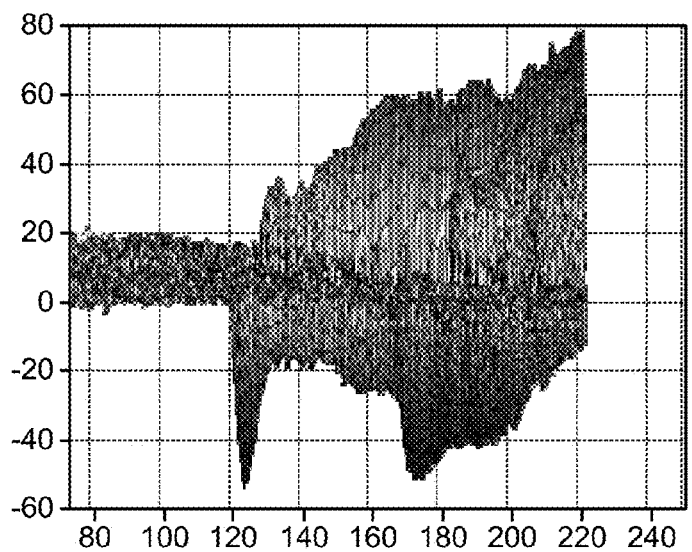

FIG. 10a shows an example of a situation in which a "second image" is captured as described in relation to 425 of FIG. 4. Specifically, a back light source is emitting light while the image is captured. In this instance, a hand is hovering over the screen. Due to the angle and intensity of the illumination, a shadow is cast under the hand. FIGS. 10b and 10c show two perspectives of a background-subtracted brightness map calculated based on the second image. The z-axis of the map and the coloring indicate the brightness of each pixel. Positive values indicate that the pixel is brighter than the background, and negative values indicate that the pixel is darker than the background. As evidenced (e.g. particularly from the side-view perspective in FIG. 10c), the top-most pronounced values are negative—representing a shadow.

Figure 11A:
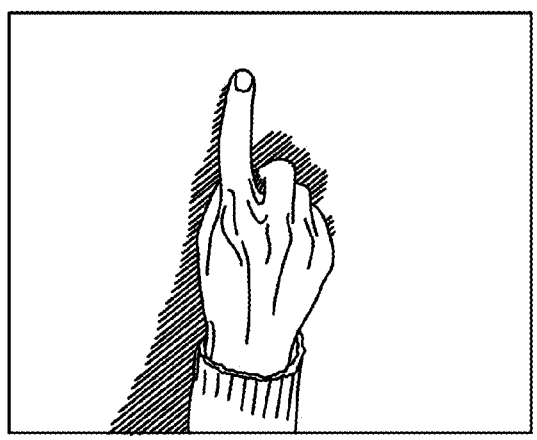
FIGS. 11a-11c show images associated with an example situation in which a finger is touching a screen while a back light source is illuminating the scene.
Figure 11B:
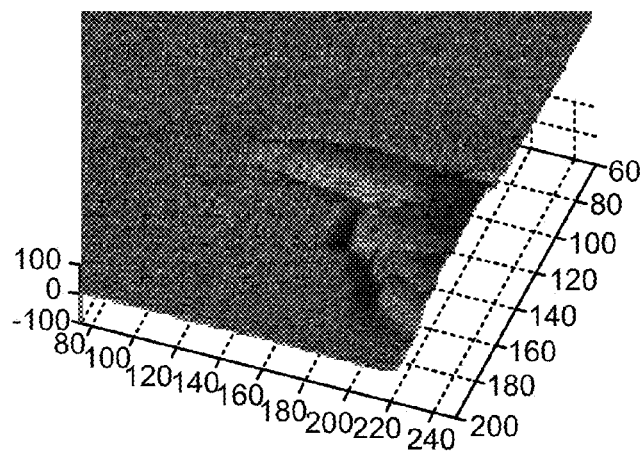
Figure 11C:
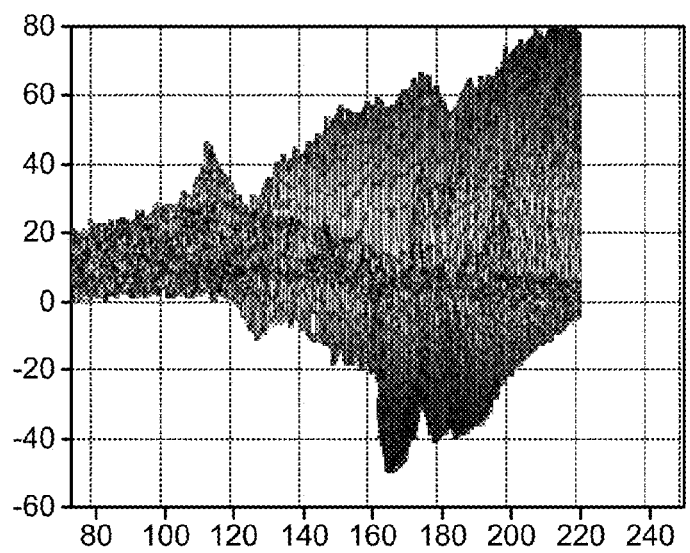

FIG. 11a shows another example of a situation in which a "second image" is captured as described in relation to 425 of FIG. 4. In this instance, a finger is touching the screen. As shown, the finger is surrounded by a bright region. FIGS. 11b and 11c show two perspectives of a background-subtracted brightness map calculated based on the second image. The z-axis of the map and the coloring again indicate the brightness of each pixel. As evidenced (e.g., particularly from the side-view perspective in FIG. 11c), the top-most pronounced values are positive—representing a bright contact border. Thus, the second images may be used to distinguish situations in which an object is hovering over a screen from situations in which an object is touching a screen.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered. Accordingly, the above description does not bound the scope of the claims.

What is claimed is:

1. A projector system, comprising:
    projection optics configured to project a display on a surface from a front side of the surface;
    a first light source configured to emit light in a first direction towards the surface from the front side of the surface;
    a second light source configured to emit light in a second direction towards the surface from the front side of the surface, wherein the light emitted in the second direction is emitted through the projection optics via a prism positioned between the second light source and a lens of the projection optics; and
    an image analyzer configured to:
        determine a position of an object placed in front of the surface, based at least in part on the emitted light in the first direction, wherein the position of the object is determined based on detecting one or more edges of the object in at least one image captured from the front side of the surface; and
        determine whether the object is touching the surface based at least in part on the emitted light in the second direction.

2. The projector system of claim 1, wherein the first light source and the second light source are configured to emit light in an alternating fashion.

3. The projector system of claim 1, wherein the projector system is a short-throw projector.

4. The projector system of claim 1, wherein determining the position of the object comprises determining one or more pixel coordinates associated with the object.

5. The projector system of claim 1, wherein the image analyzer is further configured to determine a region of interest that includes the determined position of the object, and wherein determining whether the object is touching the surface is based at least in part on the determined region of interest.

6. The projector system of claim 5, wherein the image analyzer is further configured to analyze brightness variation within the region of interest, and wherein determining whether the object is touching the surface is based at least in part on the analyzed brightness variation.

7. A method, comprising:
    projecting a display on a surface from a front side of the surface;
    emitting, via a first light source, light in a first direction towards the surface from the front side of the surface;
    emitting, via a second light source, light in a second direction towards the surface from the front side of the surface, wherein the light emitted in the second direction is emitted through the projection optics via a prism positioned between the second light source and a lens of the projection optics;
    determining a position of an object placed in front of the surface, based at least in part on the emitted light in the first direction, wherein the position of the object is determined based on detecting one or more edges of the object in at least one image captured from the front side of the surface; and
    determining whether the object is touching the surface based at least in part on the emitted light in the second direction.

8. The method of claim 7, wherein the light emitted in the first direction and the light emitted in the second direction are emitted in an alternating fashion.

9. The method of claim 7, wherein the display is projected on the surface via a short-throw projector.

10. The method of claim 7, wherein determining the position of the object comprises determining one or more pixel coordinates associated with the object.

11. The method of claim 7, further comprising determining a region of interest that includes the determined position of the object, and wherein determining whether the object is touching the surface is based at least in part on the determined region of interest.

12. The method of claim 11, wherein further comprising analyzing brightness variation within the region of interest, and wherein determining whether the object is touching the surface is based at least in part on the analyzed brightness variation.

13. A projector system, comprising:
    means for projecting a display on a surface from a front side of the surface;
    means for emitting, via a first light source, light in a first direction towards the surface from the front side of the surface;
    means for emitting, via a second light source, light in a second direction towards the surface from the front side of the surface, wherein the light emitted in the second direction is emitted through the projection optics via a prism positioned between the second light source and a lens of the projection optics;
    means for determining a position of an object placed in front of the surface, based at least in part on the emitted light in the first direction, wherein the position of the object is determined based on detecting one or more edges of the object in at least one image captured from the front side of the surface; and
    means for determining whether the object is touching the surface based at least in part on the emitted light in the second direction.

14. The projector system of claim 13, wherein the light emitted in the first direction and the light emitted in the second direction are emitted in an alternating fashion.

15. The projector system of claim 13, wherein the display is projected on the surface via a short-throw projector.

16. The projector system of claim 13, wherein the means for determining the position of the object comprises means for determining one or more pixel coordinates associated with the object.

17. The projector system of claim 13, further comprising means for determining a region of interest that includes the determined position of the object, and wherein determining whether the object is touching the surface is based at least in part on the determined region of interest.

18. The projector system of claim 17, further comprising means for analyzing brightness variation within the region of interest, and wherein determining whether the object is touching the surface is based at least in part on the analyzed brightness variation.

19. A non-transitory computer-readable medium containing instructions which, when executed by a processor, cause the processor to perform steps of, comprising:
  projecting a display on a surface from a front side of the surface;
  emitting, via a first light source, light in a first direction towards the surface from the front side of the surface;
  emitting, via a second light source, light in a second direction towards the surface from the front side of the surface, wherein the light emitted in the second direction is emitted through the projection optics via a prism positioned between the second light source and a lens of the projection optics;
  determining a position of an object placed in front of the surface, based at least in part on the emitted light in the first direction, wherein the position of the object is determined based on detecting one or more edges of the object in at least one image captured from the front side of the surface; and
  determining whether the object is touching the surface based at least in part on the emitted light in the second direction.

20. The non-transitory computer-readable medium of claim 19, wherein the light emitted in the first direction and the light emitted in the second direction are emitted in an alternating fashion.

21. The non-transitory computer-readable medium of claim 19, wherein the display is projected on the surface via a short-throw projector.

22. The non-transitory computer-readable medium of claim 19, wherein determining the position of the object comprises determining one or more pixel coordinates associated with the object.

23. The non-transitory computer-readable medium of claim 19, wherein the instructions further cause the processor to determine a region of interest that includes the determined position of the object, and wherein determining whether the object is touching the surface is based at least in part on the determined region of interest.

24. The non-transitory computer-readable medium of claim 23, wherein the instructions further cause the processor to analyze brightness variation within the region of interest, and wherein determining whether the object is touching the surface is based at least in part on the analyzed brightness variation.

* * * * *